United States Patent [19]

Emura

[11] Patent Number: 4,588,271
[45] Date of Patent: May 13, 1986

[54] OVERHEAD PROJECTOR

[75] Inventor: Bunsuke Emura, Musashino, Japan

[73] Assignee: Fuji Photo Film Co., Ltd., Kanagawa, Japan

[21] Appl. No.: 645,965

[22] Filed: Aug. 31, 1984

[30] Foreign Application Priority Data

Sep. 2, 1983 [JP] Japan ............................ 58-136177[U]
Sep. 6, 1983 [JP] Japan ............................ 58-138020[U]

[51] Int. Cl.⁴ ............................................. G03B 21/06
[52] U.S. Cl. ..................................... 353/66; 353/119; 353/72
[58] Field of Search ... 353/119, 122, DIG. 1–DIG. 6, 353/65, 66, 67, 98, 99, 38, 72, 63, 64

[56] References Cited

U.S. PATENT DOCUMENTS 2,496,647  2/1950  Woodbury ............... 353/DIG. 3 X
2,767,611  10/1956  Fitzgerald ........................ 353/73 X
3,209,646  10/1965  Appeldorn et al. ....... 353/DIG. 3 X
3,459,475  8/1969  Lucas ................................ 353/38 X
3,516,733  6/1970  Lucas ....................... 353/DIG. 4 X
3,525,566  8/1970  Altman ................................. 353/66

Primary Examiner—Harry N. Haroian
Attorney, Agent, or Firm—Sughrue, Mion, Zinn, Macpeak, and Seas

[57] ABSTRACT

A portable overhead projector wherein characters, a picture and the like drawn on a transparent sheet rested on a horizontally supported stage can be projected onto a screen or the like, and having a safety device in which a projection unit can avoid impinging upon a mirror-Fresnel plate, thereby preventing damage to it. This safety device features a lock mechanism for preventing projection unit supports from rotating unless the projection unit is folded toward the supports. Furthermore, the overhead projector has a rotatable support for one side of the mirror-Fresnel plate whereby the mirror-Fresnel plate is held horizontally during projection, and is inclined during housing, whereby the projection unit is housed in a space formed by the inclining of the mirror-Fresnel plate.

12 Claims, 8 Drawing Figures

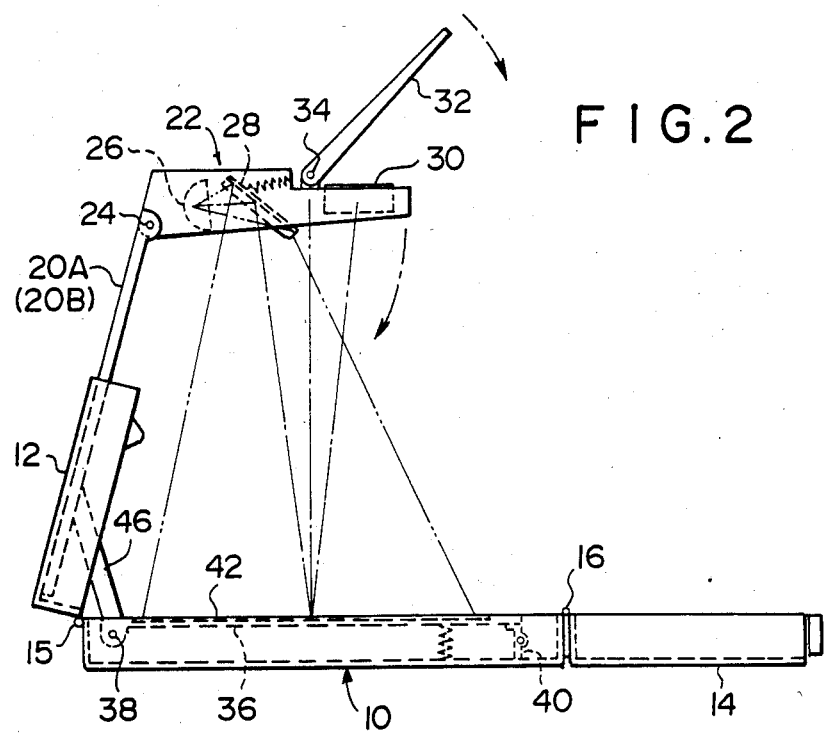
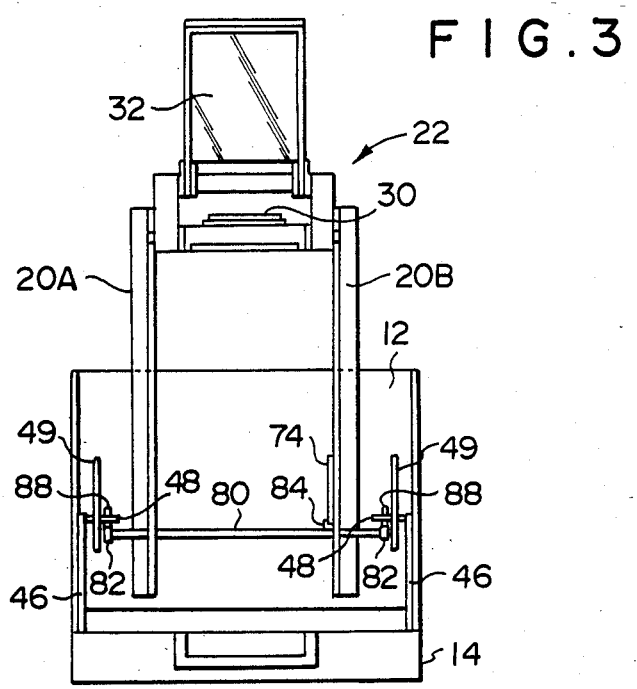

OVERHEAD PROJECTOR

BACKGROUND OF THE INVENTION

1. Field of the Invention

This invention relates to an overhead projector, in which characters, a picture and the like drawn on a transparent sheet rested on a horizontally supported member are projected onto a screen or the like, and more particularly to a conveniently portable overhead projector.

2. Description of the Prior Art

As well known, in a reflectory type overhead projector, a light source positioned upwardly of a mirror-Fresnel plate illuminates an object to be projected, which is disposed on the mirror-Fresnel plate, the light is reflected therefrom toward the light source, the reflected light is enlarged and projected onto a screen via a projecting lens, a direction changing mirror and the like. As described above, in the reflectory type overhead projector, the light source is positioned upwardly of the mirror-Fresnel plate similarly to a projection unit, whereby the thickness of the overhead projector downwardly from the mirror-Fresnel plate becomes small as compared with a transmission type overhead projector, in which the object to be projected is illuminated by the light source positioned downwardly of a Fresnel plate, so that the overhead projector is advantageously rendered compact in size. In consequence, in order to make the overhead projector portable, the reflectory type overhead projector should be adopted through the utilization of the aforesaid advantage.

Now, the above-described portable overhead projector should be rendered compact in size to be conveniently portable by adopting such an arrangement that a projection unit and supports are folded toward the mirror-Fresnel plate. However, if the supports, to which the projector unit is mounted, are folded before the folding of the projection unit, there is a possibility that the forward end portion of the projection unit upon the mirror-Fresnel plate to damage it.

Furthermore, in order to make the overhead projector portable, it is necessary that the overhead projector be housed in a portable case, which can be hung down by hand. With the overhead projector housed in the above-described portable case, the mirror-Fresnel plate is held horizontally through the utilization of an edge portion of the top surface of the case during projection.

In a construction for mounting the mirror-Fresnel plate to the overhead projector as described above, a space downwardly from the mirror-Fresnel plate in the case forms a dead space. In consequence, in housing the conventional overhead projector, the mirror-Fresnel plate is temporarily removed from the edge portion of the case, the projection unit, supports and the like are housed in the case, and thereafter, the mirror-Fresnel plate is placed on the overhead projector for housing it. To omit the aforesaid operation of removing the mirror-Fresnel plate, it may be possible to affix the mirror-Fresnel plate to the edge portion of the top surface of the case. However, such a fixation as described above results in that the aforesaid dead space is formed beneath the mirror-Fresnel plate and the case for housing itself becomes large in its volume, thus adversely affecting portability.

SUMMARY OF THE INVENTION

The present invention has been developed to obviate the above-described disadvantages of the prior art and has as its object the provision of a safety device for an overhead projector, in which the projection unit can avoid impinging upon the mirror-Fresnel plate so as not to damage it during folding for housing the overhead projector.

To this end, the present invention provides a lock mechanism for preventing the supports for supporting the projection unit from rotating, in order to make the supports foldable when the projection unit is folded toward the supports.

Furthermore, another object of the present invention is to provide a construction for mounting the mirror-Fresnel plate, wherein the case for housing the overhead projector can be effectively utilized without forming a dead space.

To this end, the present invention contemplates that one side of the mirror-Fresnel plate is rotatably supported on the case, the mirror-Fresnel plate is horizontally held during projecting operation, and the mirror-Fresnel plate is declined to effectively utilize the space when the overhead projector is housed in the case.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 2 is a left side view showing the general arrangement of the overhead projector according to the present invention;

FIG. 3 is a front view showing the overhead projector according to the present invention;

DETAILED DESCRIPTION OF THE INVENTION

Description will hereunder be given of the preferred embodiment of an overhead projector according to the present invention with reference to the accompanying drawings.

Figure 1:
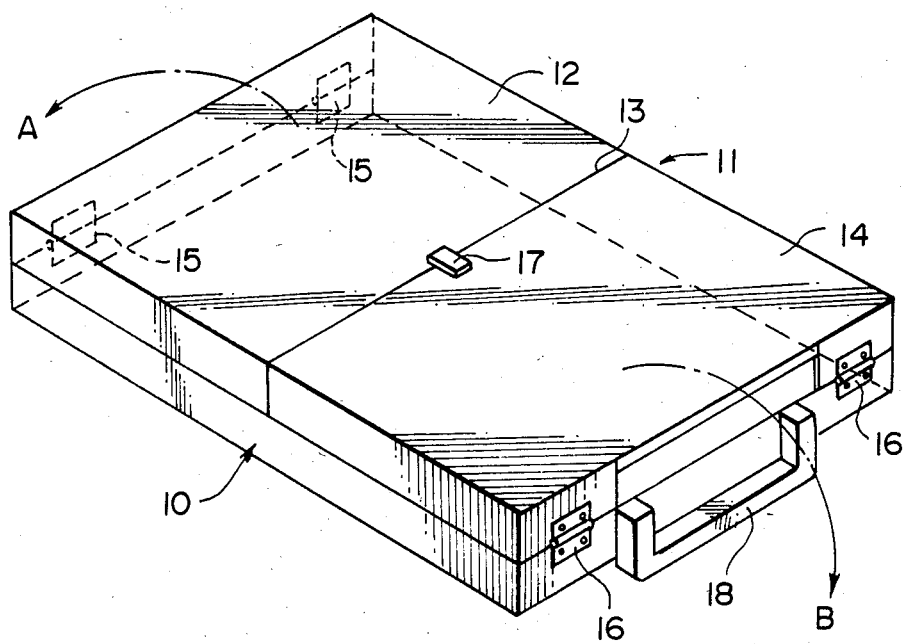
FIG. 1 is a perspective view generally showing the case housing the overhead projector according to the present invention.

FIG. 1 shows the general configuration of a case housing the overhead projector, in which designated at 10 is a box member forming the case, and 11 a lid for the box member 10. This lid 11 is split into a lid half-portion 12 and another lid half-portion 14, bordering on a split line 13. The lid half-portion 12 is pivotally supported on an edge portion of one side of the box member 10 via hinges 15 and 15, and also, the lid half-portion 14 is pivotally supported on an edge portion of the other side of the box member 10 via hinges 16 and 16. In consequence, the lid half-portion 12 is rotated about the hinges 15 and 15 in a direction indicated by an arrow A, and the lid half-portion 14 is rotated about the hinges 16 and 16 in a direction indicated by an arrow B, thus enabling opening of the box member 10 in a clamshell fashion. Referring to FIG. 1, reference numeral 17 is a catch for connecting the lid half-portions 12 and 14 to each other, and a member shown at reference numeral 18 is a handgrip for hanging down the box member 10.

FIGS. 2 and 3 show a state where the lid half-portions 12 and 14 are opened and the overhead projector is taken out and unfolded. Inside the lid half-portion 12, there are provided a pair of supports 20A and 20B extending upwardly. A projection unit 22 is pivotally supported on the top end portions of the supports 20A and 20B. The projection unit 22 includes a light source 26, a mirror 28, a projecting lens 30, a direction changing mirror 32 and the like. The mirror 32 is rotatable through a pin 34 and can adjust the position of projection on a screen, not shown, and can be folded toward the projecting lens 30 during housing.

A base board 36 for the mirror-Fresnel plate is pivotally supported on a side wall of the box member 10 via a pin 38. This base board 36 is held in the horizontal position by a detachable engaging member 40 to be described hereunder and the mirror-Fresnel plate 42 is installed on the top surface of the base board 36. In consequence, the light emitted from the light source 26 is reflected by a mirror 28, illuminates the mirror-Fresnel plate 42, thereafter, is reflected by the mirror-Fresnel plate 42, and goes into a projecting lens 30. Further, the light exiting from the projecting lens is enlarged and projected onto a screen, not shown, positioned to the right in FIG. 2 by a direction changing mirror 32.

Figure 4:
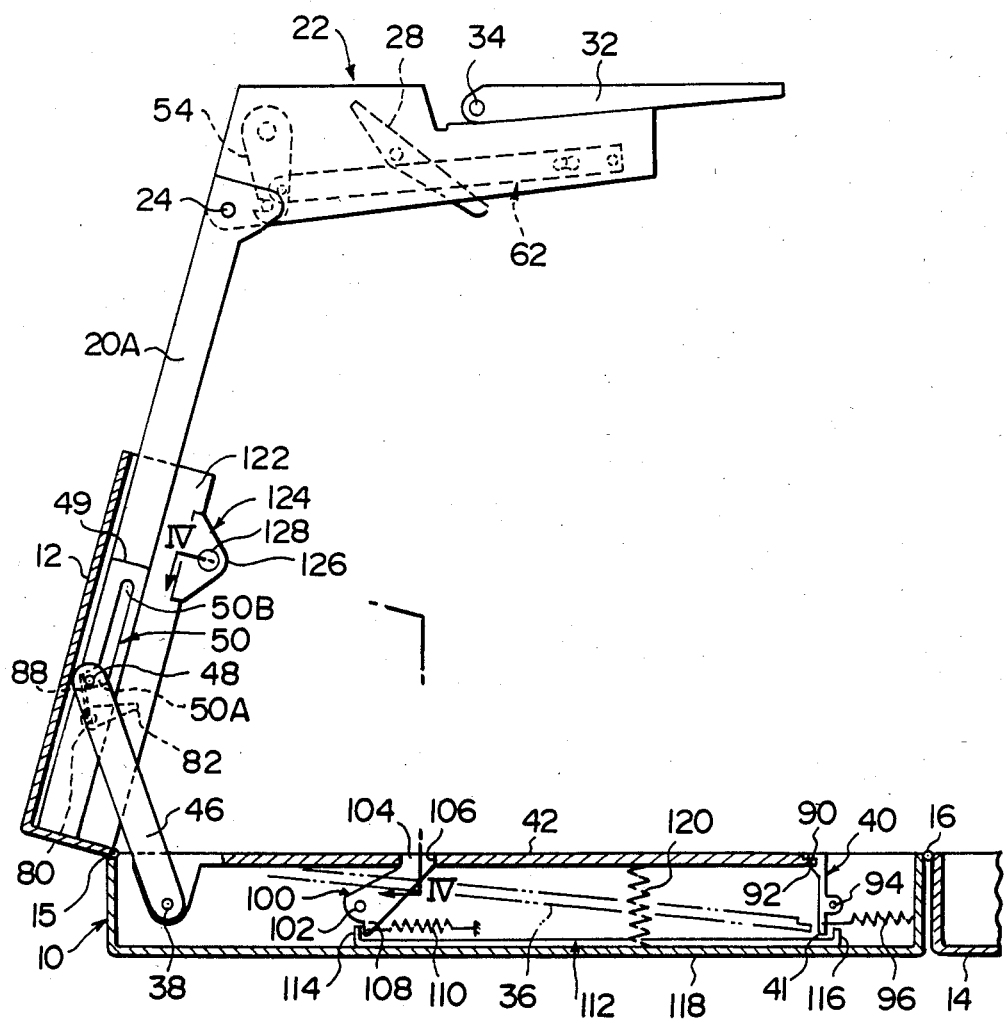
FIG. 4 is a sectional left side view, with the essential portions enlarged, showing the overhead projector according to the present invention.
Figure 5:
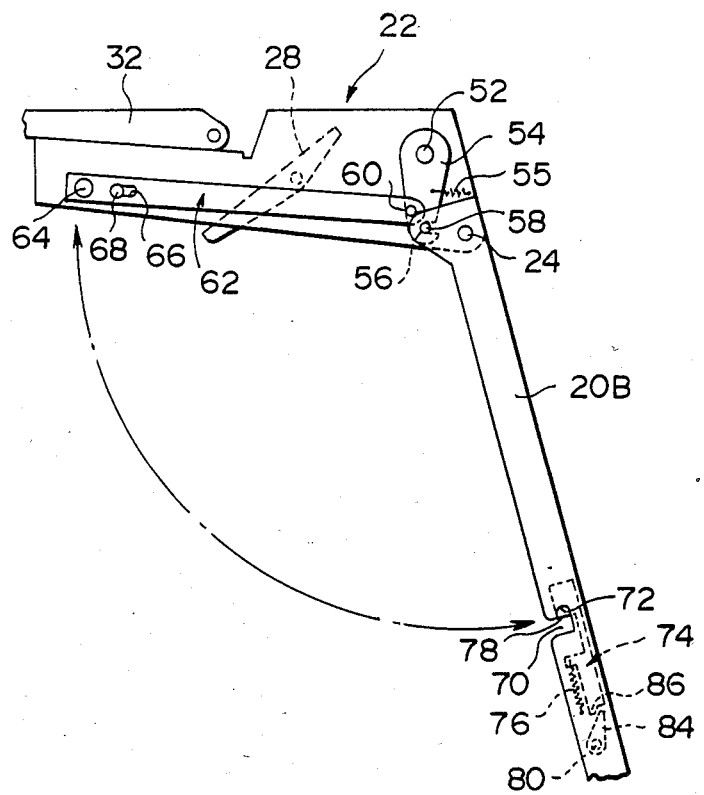
FIG. 5 is a sectional right side view, with the essential portions enlarged, showing the overhead projectors according to the present invention.

Description will hereunder be given of a safety device for the overhead projector, in which the mirror-Fresnel plate 42 can avoid being damaged with reference to FIGS. 4 and 5. FIG. 4 is a left side view of this embodiment, and FIG. 5 is a right side view partially showing this embodiment. As shown in FIG. 4, a stay 46 is pivotally supported on the box member 10 through a pin 38 pivotally supporting the base board 36. This stay 46 holds the supports 20A and 20B in the erected state through the lid half-portion 12 as shown in FIG. 4. A pin 48 is provided on the top end portion of the stay 46. The pin 48 is loosely coupled into a J-shaped guide groove 50 formed in a guide plate 49 solidly secured to the inner surface of the lid half-portion 12. When the pin 48 of the stay 46 is positioned in an inclined portion 50A of the guide groove 50 as shown in FIG. 4, the supports 20A and 20B can be supported in the erected state as shown in FIG. 4. When the pin 48 is positioned in a straightlined portion 50B of the guide groove 50, the pin 48 slides upwardly in this guide groove 50, so that the lid half-portion 12 and supports 20A and 20B can be folded toward the box member 10. In consequence, if the pin 48 is in a position as shown in FIG. 4, then the supports 20A and 20B can be prevented from being folded. Each of pairs of the stay 46 and guide plate 49 thus constructed is provided at each of opposite sides of the lid halfportion 12 as shown in FIG. 3. As shown in FIG. 5, an engaging plate 54 is pivotally supported on the right side surface of the projection unit 22 pivotally supported on a portion between the supports 20A and 20B via the pin 24. This engaging plate 54 is biased by a spring 55 to be rotatable about a pin 52 in the counterclockwise direction in FIG. 5. The engaging plate 54 is formed at the bottom end portion thereof with a recess 56. When a pin 58 formed on the support 20B is coupled into the recess 56, the projection unit 22 is prevented from rotating in the counterclockwise direction in FIG. 5, i.e. the projection unit 22 is prevented from rotating about the pin 24 toward the supports 20A and 20B, whereby the projection unit 22 is held in the erected position as shown in FIGS. 4 and 5. The right end portion of a connecting lever 62 is pivotally supported on the engaging plate 54 via a pin 60, and the left end portion of this lever 62 is projectingly provided with a pin-shaped knob 64. This movable lever 62 is formed therein with a slot 66, into which is loosely coupled a stopper pin 68 projecting from the right side surface of the projection unit 22. In consequence, the movable lever 62 is movable as much as the stopper pin 68 can move within the slot 66. This moving stroke has a movement value sufficient for removing the engaging plate 54 from the pin 58. To fold the projection unit 22, the knob 64 is operated to slightly rotate the engaging plate 54 about the pin 52 in the clockwise direction in FIG. 5 against the biasing force of the spring 55 so as to remove the pin 58 from the recess 56, whereby the projection unit 22 is rotated about the pin 24 in the counterclockwise direction in FIG. 5, so that the projection unit 22 can be folded into a space formed between the supports 20A and 20B.

A groove 70 is formed at the bottom end portion of the support 20B and a recess 72 communicated with this groove 70 is formed upwardly from the lower portion of this groove 70. This groove 70 is formed at a position, into which the knob 64 is coupled when the projection unit 22 is rotated about the pin 24 to be folded. A lock plate 74 is supported at the position of the groove 70 in the support 20B in a manner to be movable in the axial direction of the support 20B. The lock plate 74 is biased downwardly by a spring 76 lower in resiliency than the spring 55, and an edge 78 formed on the lock plate 74 is positioned at the recess 72. In consequence, when the projection unit 22 is folded and the knob 64 is coupled into the groove 70, the movable lever 62 is moved upwardly because the spring 55 is higher in resiliency than the spring 76, whereby the lock plate 74, which has been abutting against the knob 64, moves upwardly.

On the other hand, a common shaft 80 is pivotally supported on the supports 20A and 20B. Levers 82 and 82 are solidly secured to the opposite ends of the common shaft 80 as shown in FIGS. 3 and 4. As shown in FIGS. 3 and 5, this common shaft 80 is projectingly provided at the right end thereof with a pawl 84 projecting in the radial direction. A projection 86 formed at the bottom end of the lock plate 74 is positioned within a sector of rotation of this pawl 84. More specifically, when the lock plate 74 is located at a position shown in FIG. 5, the common shaft 80 cannot be rotated because the pawl 84 abuts against the projection 86 of the lock plate 74. However, when the lock plate 74 is upwardly moved against the biasing force of the spring 76 to be retracted from the sector of rotation of the pawl 84, the common shaft 80 can be rotated. As shown in FIGS. 3 and 4, the common shaft 80 is provided at the opposite ends thereof with push pieces 88 and 88 making an angle of about 90° with the levers 82 and 82, and these push pieces 88 and 88 are located in a position where they can abut against the pins 48 and 48. In consequence, if the levers 82 and 82 are rotated in the clockwise direction in FIG. 4, then the pins 48 and 48 can be pushed out of the inclined portions 50A and 50A of the guide grooves 50 and 50 by the push pieces 88 and 88 to be moved into the straight-lined portions 50B and 50B of the guide grooves 50 and 50.

Description will hereunder be given of the construction for supporting the mirror-Fresnel plate of the overhead projector according to the present invention. As shown in FIG. 4 in detail, the left side of the base board 36 is held horizontally by the engaging member 40. More specifically, a groove 90 is formed on the upper portion of the engaging member 40 and a thin plate portion 92 formed at the right side of the base board 36 in FIG. 4 is inserted into the groove 90, whereby the base board 36 is held horizontally. The engaging member 40 is pivotally supported at the substantially central portion thereof on the side wall of the box member 10 through a pin 94. Further, the engaging member 40 is biased at the bottom end portion 41 thereof by a spring 96 in a manner to be rotatable about the pin 94 in the counterclockwise direction. In consequence, unless a force acts on the engaging member 40 from outside, the engaging member 40 is biased to rotate about the pin 94 by the biasing force of the spring 96 in the counterclockwise direction, i.e. the direction in which the thin plate portion 92 is inserted into the groove 90.

On the other hand, a rocking lever 100 is rockingly supported on the side wall of the box member 10 through a pin 102, beneath the base board 36. The top end portion 104 of the rocking lever 100 is positioned in an opening 106 formed at the side edge of the base board 36, and the rocking lever 100 is engaged at the bottom end portion 108 thereof with a spring 110, whereby the rocking lever 100 is biased to rotate about a pin 102 in the counterclockwise direction. In consequence, when the top end portion 106 of the rocking lever 100 is pressed, the rocking lever 100 rotates about the pin 102 against the biasing force of the spring 110 in the clockwise direction. However, unless an external force is applied to the top end portion 104, the rocking lever 100 is returned to the original position as shown in FIG. 4 by the biasing force of the spring 110.

The bottom end portion 108 of the rocking lever 100 and the bottom end portion 41 of the engaging member 40 are connected to each other by a movable lever 112. More specifically, the left end portion 114 of the movable lever 112 is bent upwardly and can abut the bottom end portion 108 of the rocking lever 100. Also, the right end portion 116 of the movable lever 112 is bent similarly and can abut the bottom end portion 41 of the engaging member 40. In consequence, if the top end portion 104 of the rocking lever 100 is pushed down from the position shown in FIG. 4, then the movable lever 112 is moved to the left by the bottom end portion 108 of the rocking lever 100, whereby the right end portion 116 of the movable lever 112 rotates the engaging member 40 in the clockwise direction against the biasing force of the spring 96, so that the thin plate portion 92 is removed from the groove 90 of the engaging member 40. A return spring 120 is provided between the base board 36 and a bottom plate 118 of the box member 10.

Figure 6:
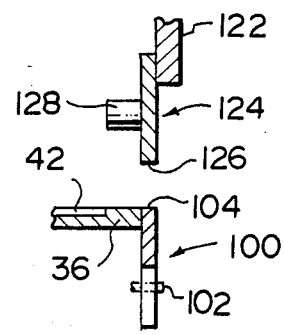
FIG. 6 is a partially sectional view along IV—IV of FIG. 4 showing the push-down means for the mirror-Fresnel plate.

On the other hand, as shown in FIG. 6, a projecting piece 124 is provided on an edge portion 122 of the side wall of the lid half-portion 12. The projecting piece 124 is formed at a position opposed to the top end portion 104 of the rocking lever 100 in the state where the lid half-portion 12 is closed. As shown in FIG. 6, the projecting piece 124 is constructed into two stepped portions including a first contact portion 126 and a pin-shaped second contact portion 128. In this projecting portion 124, when the lid half-portion 12 is closed, the first contact portion 126 comes into contact with the rocking lever 100 to push it down, and then, the second contact portion 128 comes into contact with the base board 36 to push it down toward the bottom plate 118.

The following is the action of the embodiment with the above-described arrangement according to the present invention. In using the overhead projector, firstly, an object to be projected, such as a transparent sheet, etc. is placed on the mirror-Fresnel plate 42 as shown in FIG. 2, and illuminated by the light source 26. The light emitted from the light source 26 is reflected by the mirror 28. Thereafter, the light illuminates the mirror-Fresnel plate 42, and is reflected by the mirror-Fresnel plate 42, illuminates the object to be projected, which is disposed on the mirror-Fresnel plate 42, and thereafter, goes into the projecting lens 30. Further, the light exiting from the projecting lens 30 is enlarged and projected onto the screen (not shown), which is positioned at the upper right portion of FIG. 2, by the direction changing mirror 32.

Next, in housing the overhead projector according to this embodiment, firstly, the mirror 32 is rotated about the pin 34, folded toward the projecting lens 30. Subsequently, the projection unit 22 is rotated about the pin 24 in the clockwise direction, and folded toward the supports 20A and 20B as shown in FIG. 7.

The following shows how to fold the projection unit 22. Firstly, when the knob 64 of the connecting lever 62 is moved to the left in FIG. 5, the engaging plate 54 is removed from the pin 58, whereby the projection unit 22 becomes foldable. Subsequently, when the projection unit 22 is folded as shown in FIG. 7, the knob 64 is inserted into the groove 70 formed in the support 20B as shown in FIG. 5. When the knob 64 is inserted into the groove 70, the knob 64 is pulled up by the biasing force of the spring 55, the lock plate 74 moves upwardly against the biasing force of the spring 76, and the projection 86 of the lock plate 74 is retracted from the sector of rotation of the pawl 84, whereby the common shaft 80 becomes rotatable. When the lever 82 is rotated in the clockwise direction in FIG. 4 in this state, the pin 48 secured to the stay 46 is pushed out into the straight-lined portion 50B of the groove 50 by the push piece 88, so that the supports 20A and 20B become rotatable about the hinges 15 and 15. The lid half-portions 12 and 14 are closed as indicated by arrows in FIG. 7 in this state, and the overhead projector can be housed as shown in FIG. 8. Only when the projection unit 22 is folded as described above do the supports 20A and 20B become rotatable. Hence, in the state where the projection unit 22 is unfolded, the supports 20A and 20B are also unfolded, so that the forward end of the projection unit 22 will not impinge upon the mirror-Fresnel plate 42 to damage it.

Figure 7:
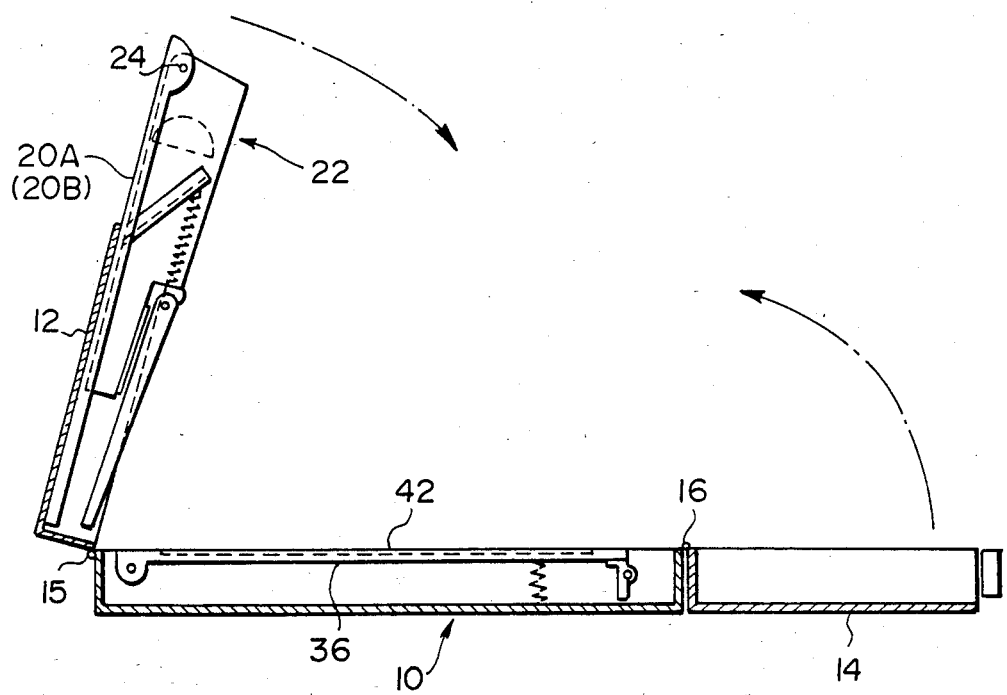
FIG. 7 is a sectional left side view showing the steps of housing the overhead projector according to the present invention.
Figure 8:
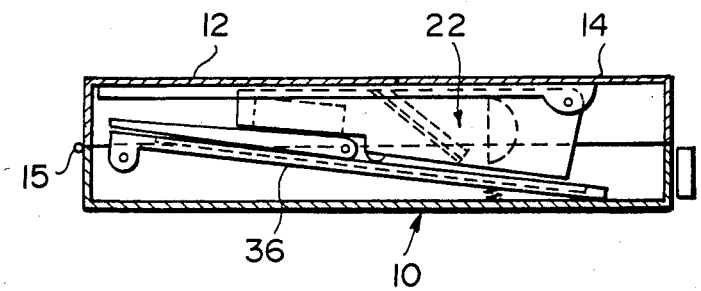
FIG. 8 is a sectional view showing the housed state of the overhead projector according to the present invention.

Next, when the lid half-portion 12 is rotated about the hinges 15 and 15 in the clockwise direction from the state shown in FIG. 7, firstly, the first contact portion 126 of the projecting piece 124 of the lid half-portion 12 presses the top end portion 104 of the rocking lever 100 (FIG. 6). When the rocking lever 100 is pressed by the first contact portion 126, the rocking lever 100 rotates about the pin 102 in the clockwise direction against the biasing force of the spring 110, whereby the movable lever 112 is moved to the left, as shown in FIG. 4. When the movable lever 112 moves to the left against the biasing force of the spring 96, the engaging member 40 is rotated about the pin 94 in the clockwise direction, whereby the thin plate portion 92 of the base board 36 is removed from the groove 90 of the engaging member 40. When the lid half-portion 12 is further pushed down, the second contact portion 128 of the projecting piece 124 pushes down the base board 36. In this state, the portion of the base board 36 on the side of the engaging member 40 is released from the groove 90 of the engaging member 40 and is pushed down against the biasing force of the spring 120. As the result, the base board 36 is declined to a position indicated by two-dot chain lines as shown in FIG. 4, whereby a space for housing the projection unit and the like is formed above the base board 36. FIG. 8 shows this state. Upon closing one lid half-portion 12, the other lid half-portion 14 can be closed, thus completing the housing operation.

In the above embodiment, to engage or disengage the engaging member 40, the link mechanism including the rocking lever 100 and the movable lever 112 is used. However, the engaging member 40 may be directly engaged or disengaged by the projecting piece 124.

Furthermore, in the above embodiment, the supports 20A and 20B are secured to the box member 10 through the lid half-portion 12 to support the projection unit 22. However, the lid half-portion 12 may be separated from the supports and the supports may be directly supported by the box member. In that case, the member 10 for releasing the engaging member 40 and the member for pushing down the base board 36 may be secured to the supports.

The safety device for protecting the mirror-Fresnel plate from being damaged may be used in any overhead projector which can be folded into a plate-shaped base frame, and which has foldable supports.

In the above embodiment, the lid half-portion 14 is secured to the box member 10 through the hinges 16 and 16. However, the lid half-portion 14 may be pivotally supported on the lid half-portion 12 (i.e. the portion of the split line 13) through the hinges. In this case, during projection the lid half-portion 14 can be bent to the side of the lid half-portion 12 along the split line 13, whereby the surfaces of the lid half-portions 12 and 14 face each other. As a further alternative, the lid 11 need not necessarily be split, so that a single lid may be used.

In the above embodiment, the stays 46, pins 48, the guide plates 49, levers 82 and push pieces 88 are provided at the opposite ends of the common shaft 80. However, the above-described members may be provided at one side of the common shaft 80.

As has been described hereinabove, with the safety device of the overhead projector according to the present invention, there is provided a lock mechanism for locking the rotation of the supports. This lock mechanism prevents the supports from rotating in the state where the projection unit is unfolded, and the locking is released in the state where the projection unit is folded to the side of the supports, whereby the supports can be folded into the base board only when the projection unit is folded, so that the supports cannot be folded in the state where the projection unit is unfolded, thereby avoiding damaging the expensive mirror-Fresnel plate disposed on the base board with the forward end of the projection unit.

Furthermore, in the construction for mounting the mirror-Fresnel plate of the overhead projector according to the present invention, the engaging member for holding the mirror-Fresnel plate in the horizontal position is released as the lid of the housing case is closed, and the mirror-Fresnel plate is pressed downwardly, whereby the space for housing the projection unit, supports and the like is secured, so that the housing case itself can be small in thickness, thus rendering the housing case compact in size to be conveniently portable.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An overhead projector wherein an object to be projected, which is disposed on a reflective Fresnel plate, is illuminated, and the light reflected therefrom is projected onto a screen, comprising:
    a base frame to which said reflective Fresnel plate is secured;
    at least one support pivotally supported at its bottom end on said base frame, and foldable toward said base frame;
    a projection unit pivotally supported at a top portion of said at least one support and including an illumination optical system and a projection optical system, said projection unit being movable to a folded position and an unfolded position;
    a support lock releasing member provided on said projection unit;
    a projection unit lock mechanism for locking said projection unit against said at least one support when said projection unit is in said folded position; and
    a support lock mechanism, comprising a lock member provided on said at least one support and movable between a locked position, in which said at least one support is erect, and an unlocked position, said releasing member moving said lock member from said locked position to said unlocked position in response to movement of said projection unit to said folded position.

2. An overhead projector as set forth in claim 1, wherein said base frame comprises a box member for housing said projection unit.

3. An overhead projector as set forth in claim 1, wherein said projection unit lock mechanism comprises a first knob extending from said projection unit, said at least one support having a first recess formed therein, such that when said projection unit is in a folded position, said first knob may be inserted into the recess.

4. An overhead projector as set forth in claim 3, wherein said projection unit lock mechanism further comprises:
    a movable lever having its distal end connected to said first knob;
    an engaging plate connected at one end to a proximal end of said movable lever, said engaging plate having a second recess formed at an opposite end;
    a first pin, inserted in said at least one support, and fittable into said recess of said engaging plate; and
    first biasing means for biasing said engaging lever toward said first pin,
    such that when force is exerted against said first biasing means, said first pin no longer fits into the second recess, and said projection unit can be folded toward said at least one support.

5. An overhead projector as set forth in claim 3, wherein said support lock mechanism is movably mounted to said at least one support and comprises:
   a lock plate having a projection formed in a bottom portion thereof, and an edge portion;
   second biasing means for biasing said lock plate such that said edge portion is positioned in the first recess formed in said at least one support;
   a pawl having a distal portion which contacts said projection under force supplied by said second biasing means, said projection being pulled away from the distal end of said pawl when sufficient force is applied against said second biasing means, whereby said pawl becomes rotatable about a proximal portion thereof; and
   a stay having its proximal end rotatably connected to said base frame and its distal end connected to said at least one support, such that said at least one support is locked in an unfolded position when said distal portion of said pawl contacts said projection, and is foldable toward said base frame when said distal portion of said pawl is rotated away from said projection.

6. An overhead projector as set forth in claim 3, wherein said support lock mechanism further comprises a push piece having its proximal end commonly connected to said pawl through a common lever, a distal end of said push piece being positioned at a nonzero angle relative to the distal end of said pawl, such that when said pawl is rotated away from said projection, the distal end of said push piece contacts a pin inserted at the distal end of said stay, causing said stay to rotate about its proximal end, whereby said support lock mechanism is released.

7. A overhead projector as set forth in claim 4, wherein said support lock mechanism is movably mounted on said at least one support and comprises:
   a lock plate having a projection formed in a bottom portion thereof, and an edge portion;
   second biasing means for biasing said lock plate such that said edge portion is positioned in the first recess formed in said at least one support;
   a pawl having a distal portion which contacts said projection under force supplied by said second biasing means, said projection being pulled away from the distal end of said pawl when sufficient force is applied against said second biasing means, whereby said pawl becomes rotatable about a proximal portion thereof; and
   a stay having its proximal end rotatably connected to said base frame and its distal end connected to said at least one support, such that said at least one support is locked in an unfolded position when said distal portion of said pawl contacts said projection, and is foldable toward said base frame when said distal portion of said pawl is rotated away from said projection,
   wherein force supplied by said first biasing means is greater than force supplied by said second biasing means, such that, when said first knob is inserted into said first recess, said lock plate is caused to move against force supplied by said second biasing means, said projection being pulled away from the distal end of said pawl thereby.

8. An overhead projector as set forth in claim 7, wherein said base frame comprises a box member for housing said projection unit, said overhead projector further comprising:
   pivotally supporting means for pivotally supporting a proximal end of a base board, on which said reflective Fresnel plate is disposed, at one end on said box member;
   an engaging member releasably connected to a distal end of said base board, and having a groove at one end, a distal end of said base board fitting into said groove, whereby said reflective Fresnel plate is held in a horizontal position during projection;
   an engagement releasing member provided on said box member and positioned at an opposite end of said engaging member for releasing said engaging member from connection with said base board, whereby said base board may be inclined in said box member to form a space for housing said projection unit; and
   a rocking lever, pivotally connected to said box member and having a portion which is brought into contact with a proximal end of said engagement releasing member during folding of said at least one support toward said box member, a distal end of said rocking lever providing horizontal support for said base board, said base board being inclined when force is applied against the distal end of said rocking lever, a distal end of said engagement releasing member being brought into contact with the opposite end of said engaging member thereby.

9. An overhead projector wherein an object to be projected, which is disposed on a reflective Fresnel plate, is illuminated and the reflected light is projected onto a screen, comprising:
   a projection unit, including an illumination optical system and a projection optical system;
   a box member to which said reflective Fresnel plate is secured;
   at least one support having its bottom end portion pivotally connected to said box member and being foldable toward said box member, and its top end portion pivotally connected to said projection unit, said projection unit being pivotally supported thereby; and
   pivotally supporting means for pivotally supporting said reflective Fresnel plate at one end on said box member, whereby said reflective Fresnel plate is disposed horizontally during projection, said pivotally supporting means cooperating with a pivotal operation of the bottom end portion of said at least one support such that, when said support is folded toward said box member, said reflective Fresnel plate pivots so as to be positioned nonhorizontally within said box member, thereby forming a space for housing said projection unit.

10. An overhead projector as set forth in claim 9, further comprising:
   an engaging member releasably connected to said reflective Fresnel plate, whereby said reflective Fresnel plate is held in a horizontal position during projection; and
   an engagement releasing member provided on said box member for releasing said engaging member from connection with said reflective Fresnel plate, whereby said reflective Fresnel plate may be inclined in said box member to form a space for housing said projection unit.

11. An overhead projector as set forth in claim 10, further comprising:

a base board on which said reflective Fresnel plate is disposed, a proximal end of said base board being connected to said pivotally supporting means;

said engaging member having a groove at one end, a distal end of said base board fitting into said groove, whereby said reflective Fresnel plate is held horizontally;

said engagement releasing member being positioned at an opposite end of said engaging member; and an inclining means for bringing a distal end of said engagement releasing member into contact with an opposite end of said engaging member, whereby said distal end of said base board is brought out of contact with said groove, so that said reflective Fresnel plate may be positioned nonhorizontally.

12. An overhead projector as set forth in claim 11, wherein said inclining means comprises:

a rocking lever, pivotally connected to said box member and having a portion which is brought into contact with a proximal end of said engagement releasing member during folding of said at least one support toward said box member, a distal end of said rocking lever providing horizontal support for said base board, said base board being inclined when force is applied against the distal end of said rocking lever, a distal end of said engagement releasing member being brought into contact with the opposite end of said engaging member thereby.

* * * * *